Sept. 6, 1927.  C. A. B. HALVORSON, JR  1,641,674
LENS
Filed May 10, 1923
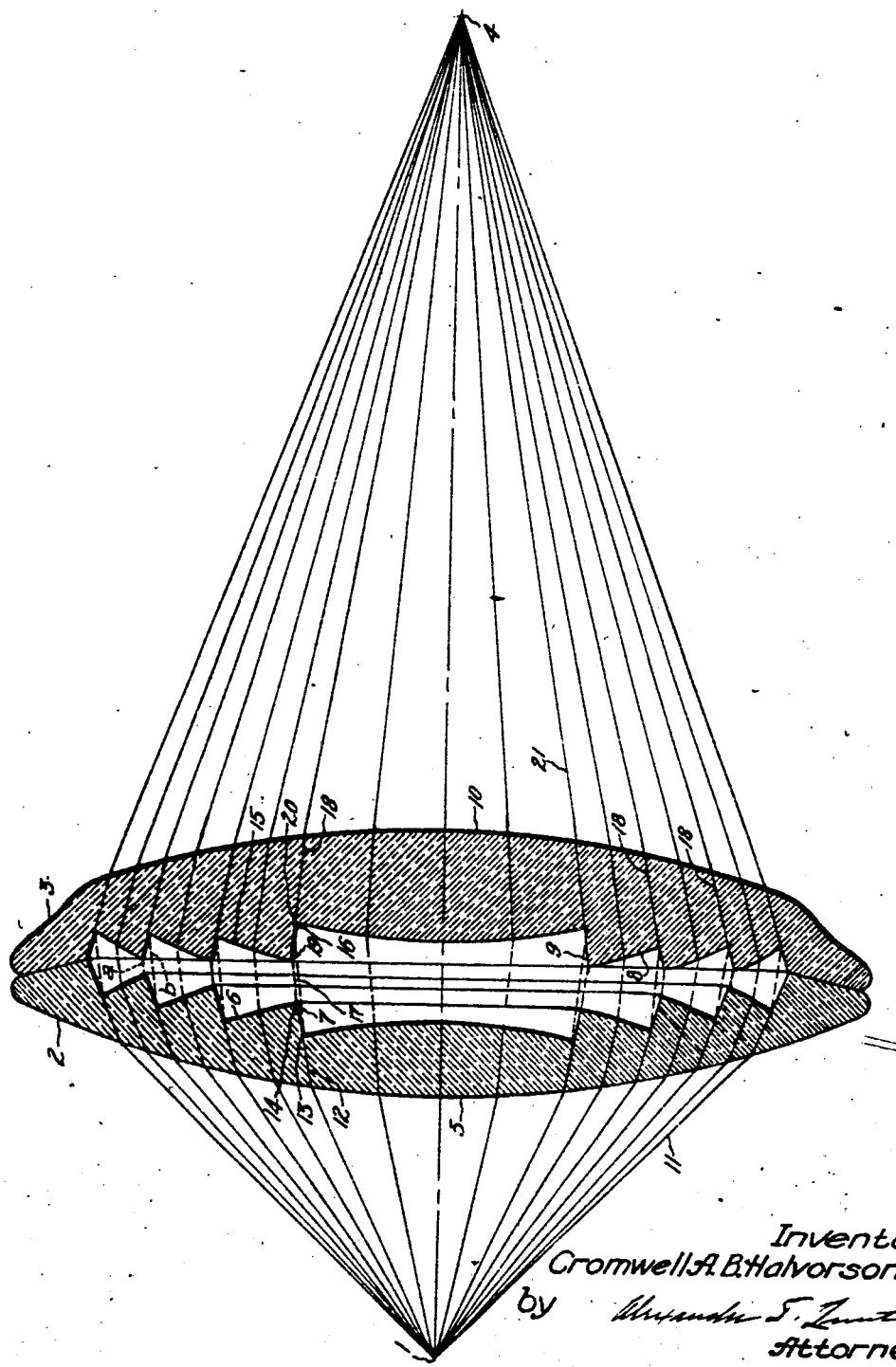
Inventor,
Cromwell A. B. Halvorson Jr.,
by
Attorney Patented Sept. 6, 1927.

1,641,674

UNITED STATES PATENT OFFICE.

CROMWELL A. B. HALVORSON, JR., OF LYNN, MASSACHUSETTS, ASSIGNOR TO GENERAL ELECTRIC COMPANY, A CORPORATION OF NEW YORK.

LENS.

Application filed May 10, 1923. Serial No. 638,114.

My invention relates to improvements in lenses which are particularly adapted for use in connection with projectors for motion pictures and the like.

It is well known that lenses of the Fresnel type have the objectionable feature that the beam produces dark bands. Also this type of lens is objectionable in that the risers on the inner surfaces are hard to keep clean and collect dust and dirt readily.

Among the objects of my invention are the following:

To provide an optical system with a lens made in two sections, each section consisting of a lens of the Fresnel type and the two sections placed with their concave faces toward each other whereby the risers may be kept free from dust and dirt;

To provide a lens of the above character in which one of the sections operates to destroy the dark bands produced by the other;

To provide other details of improvement for increasing the efficiency of a lens of the above character.

The means for accomplishing the foregoing are hereinafter more fully set forth and claimed, reference being had to the accompanying drawing which is a sectional view in elevation along a plane through the optical axis of the system.

Referring more in detail to the drawing the light source 1 is represented as a point at the left from which divergent rays extend to the convex surface of the first lens 2. When the rays strike this surface they are refracted toward the axis of the system. These rays then emerge from the lens 2 on the inner side and extend to the inner side of lens 3 thereupon they are again refracted as shown, emerging on the convex side of lens 3 and finally meeting at the focal point on the axis. The front surface 5 of the lens 2 is a continuous convex surface. The rear surface of this lens consists of a series of convex surfaces 6 joined together by conoidal surfaces 7. The surface 5 is continuous and may be of any suitable configuration, spherical or otherwise. This surface 5 having been determined the annular convex surface 6 and the conoidal surface 7 are designed so as to obtain the desired refractive effect. If any refraction toward the axis is to be obtained at surface 6, there will necessarily be a dark ring or gap formed in the beam at this surface or else a loss of light will result. Referring now to the lens 3, this lens consists of a series of annular convex surfaces 8 also joined together by conoidal surfaces 9. The last face 10 of the lens is also a continuous surface. The conoidal or riser surfaces such as surface 7 in the lens 2 are designed so as to be parallel with the refracted rays 12 inside the glass of the lens 2, in order that all the light passing thru the lens shall emerge from one of the convex surfaces 6. Inasmuch as the surfaces 6 of the lens 2 are designated so as to produce a refractive effect in the light rays these surfaces are necessarily not perpendicular to the rays and accordingly the rays of light represented by the line 12 which strike the corners 13 and 14 for example, of the riser 7 are refracted toward the axis proceeding toward the convex surface 15 and the conoidal surface 16 of the opposite lens. This construction, therefore, causes a gap 17 in the beam between the lenses 2 and 3. The convex surfaces such as the surface 15 of the lens 3 are so formed that the refracted rays 18 within the glass of the lens 3 travel in directions at least slightly convergent to the optical axis. Furthermore, the conoidal surfaces 16 are cut so as to stand parallel with the rays 18. It will be seen therefore that the rays 18 do not run in a direction normal to the surface 15. The result is that the rays that pass through the corners 13 and 14 and which are separated to cause the gap 17 are brought together again after they strike the corners 19 and 20 thus destroying the dark band 17.

It will be seen therefore, that I provide a double lens system each of the lens of which is of the Fresnel type with the concave sides facing each other. By this arrangement the corrugations which are on the concave sides of the lenses are protected from dust and dirt. Furthermore, the corrugations on one of the lenses serve to eliminate the dark rings which are caused by the corrugations in the opposite lens.

What I claim as new and desire to secure by Letters Patent of the United States, is:

1. In a double condensing system a pair of Fresnel type lenses with their concave sides facing each other, the inner surface of one of the lenses provided with a crest and trough construction for obliterating the dark bands caused by the trough and crest construction of the opposite lens, each crest and trough in each side being in optical juxtaposition to a corresponding crest and trough on the other side.

2. A condensing lens having a double set of annular refracting surfaces each crest and trough of each refracting surface on each side being in optical juxtaposition to the corresponding crest and trough of a refracting surface on the other side whereby the dark rings produced by one set are eliminated by the second.

In witness whereof, I have hereunto set my hand this 7th day of May, 1923.

CROMWELL A. B. HALVORSON, Jr.

Certificate of Correction.

Patent No. 1,641,674.                                    Granted September 6, 1927, to CROMWELL A. B. HALVORSON, Jr.

It is hereby certified that error appears in the printed specification of the above-numbered patent requiring correction as follows: Page 1, line 68, for the word " designated " read *designed;* and that the said Letters Patent should be read with this correction therein that the same may conform to the record of the case in the Patent Office.

Signed and sealed this 18th day of October, A. D. 1927.

[SEAL.]                                            M. J. MOORE,
*Acting Commissioner of Patents.*